Feb. 14, 1967 J. T. CALHOUN 3,304,051
AIR MOTOR
Filed Oct. 8, 1964

INVENTOR.
J. THOMAS CALHOUN
BY Schroeder, Siegfried
& Ryan
ATTORNEYS

United States Patent Office 3,304,051
Patented Feb. 14, 1967

3,304,051
AIR MOTOR
J. Thomas Calhoun, 3305 Shores Blvd.,
Wayzata, Minn. 55391
Filed Oct. 8, 1964, Ser. No. 402,438
6 Claims. (Cl. 253—3)

This invention relates to pneumatic or air motors and more particularly to a small improved air motor design of the industrial type.

Industrial and commercial pneumatic motors both large and small have been well known and in use for some time. The present invention is directed to the small air motor which has found increasing usage in both the Industrial and Commercial fields where the need for a high speed motor has become more prevalent. The small compact air motor has been in use in the field of dentistry as a drill operator, but these devices or designs have been far too costly and unable to withstand the rigors of industrial and commercial type usage. Further, these motors are generally complex in design and are expensive to repair. The critical feature of all motors of this high speed type is the bearing construction, and particularly the wear to which it is subjected, and in the industrial field additional loading from the work itself in addition to the high speed opertaion makes such features critical. Further, with the design of more complex machines and the usage of new metals, the need for high speed air motors as a drill operator or in a burnishing, grinding or machining operation for metal or other hard materials has required the need for a simple low cost air motor capable of high speed operation which is rugged in construction and relatively simple to maintain. The improved air motor of the present invention utilizes a simple motor construction with special provision for lubrication of bearings which substantially increases the efficiency and life of the motor and makes it readily maintainable. This improved air motor because of its compact size is able to be used in relatively small locations such as in the collet of a machine tool or in the spindle as a drill operator.

Therefore, it is an object of this invention to provide an improved air motor design.

Another object of this invention is to provide a simplified and improved air motor design which is inexpensive to manufacture, operate, repair and has improved lubrication features.

Another object of this invention is to provide in an improved air motor design a simplified means for lubrication of the bearings to increase the life of the same.

These and other objects of this invention will become apparent from a reading of the attached description together with the drawings wherein.

Figure 1:
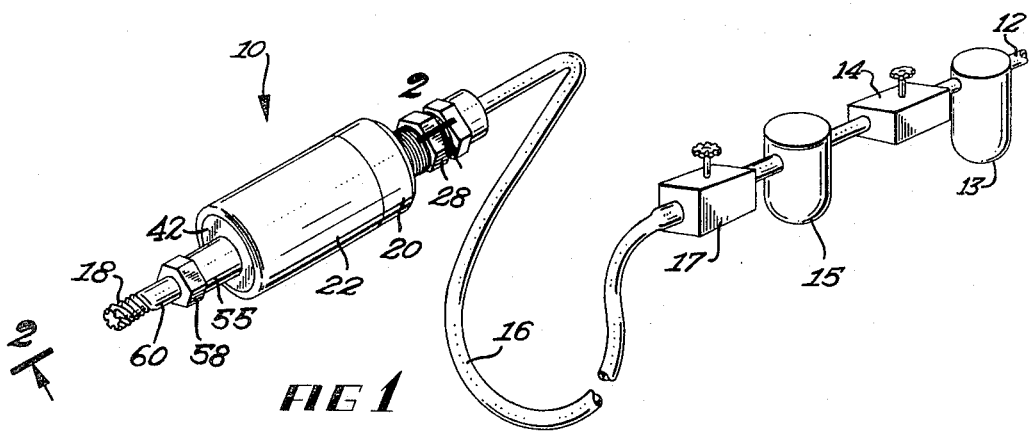
FIGURE 1 is a diagrammatic view of the air motor connected to an air source with lubrication.

The improved air motor design is shown diagrammatically in FIGURE 1 as connected to an air source and mounting a cutting tool for hand type industrial application. Thus as it will be seen in FIGURE 1, the air motor is indicated generally at 10 being connected to an air source 12. A filter 13, pressure regulator 14, lubricator 15 and a needle valve 17, all of which are convention, are shown in an air line or conduit 16 connecting the motor to the air source 12. Motor 10 is shown in FIGURE 1 as mounting a cutting tool indicated at 18. It will be understood that any tool unit for high speed operation may be mounted on and driven thereby.

Figure 2:
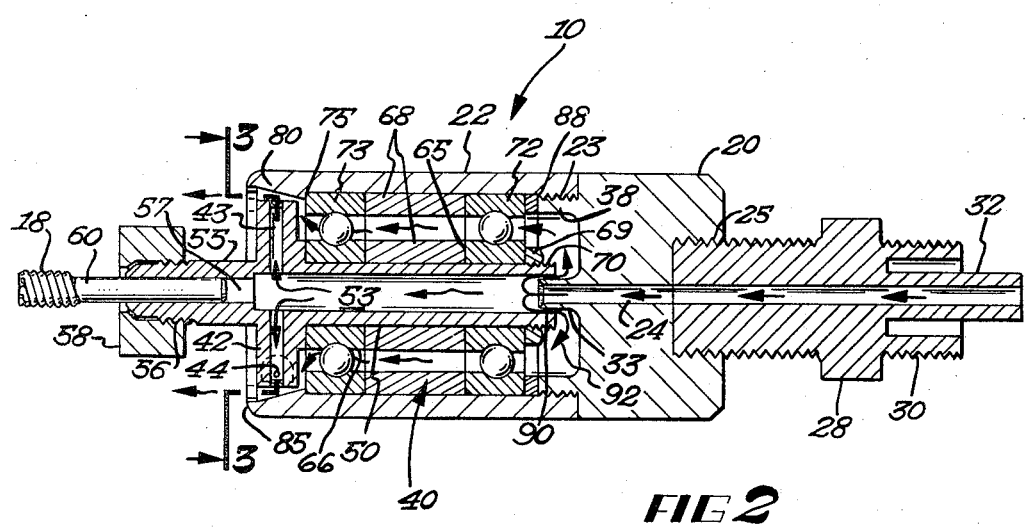
FIGURE 2 is a sectional view of the air motor with the improved lubrication features, taken along the lines 2—2 of FIGURE 1.

FIGURE 2 is a sectional view through the motor such as indicated at 2—2 in FIGURE 1 to show the internal construction of the motor which shows the novel lubricating structure and functions. Thus motor 10 includes an enclosing casing formed by an end section 20 and a cylindrical casing section 22 which are threaded together through suitable threaded connections 23 therein. End section 20 includes an inlet port 24 having a threaded portion 25 into which is positioned a threaded coupling member 28. For the purpose of connecting a flexible tubing, such as the inlet conduit 16 thereto, the conventional coupling 28 has a suitable threaded extremity 30 and a recessed tubular part 32 by means of which a pressure type clamp may connect the tubing thereon.

End section 20 has a centrally located cylindrical flange member 33 through which the inlet passage 24 extends and which flange section 33 provides the inlet air conduit into the interior of the motor, as will be hereinafter described. Further, the end section 20 includes a circular or annular flange 38 mounting the threaded portion 23 which cooperates with the internal threaded extremity on the cylindrical portion of the casing 22. Positioned within the casing parts 20 and 22 is the rotor section 40. The rotor section is made up of a cylindrical shaped impeller 42 having a pair of radially extending passages 43 therein terminating in transversely extending jet passages 44 as will be best seen in the sectional view of FIGURE 3. Extending from the cylindrical impeller section 42 is a tubular portion 50 having a central opening 53 therein which connects with the radially extending passages 43 to provide the main air passage to the impeller. On the opposite side of the impeller is positioned a second tubular section 55 having a smaller internal diameter 57 and a threaded extremity 56 which provides a coupling section for the tool to be driven by the motor. As will be seen in the sectional view, a clamping nut 58 is positioned on the threaded portion 56 and secures the shaft 60 of the cutting tool 18 therein which shaft blocks the passage through the tubular portion 55 to prevent leakage at this point. The smaller diameter passage 57 insures that a tool shaft will not block the air passage 43 in the event that the tool shaft 60 is inserted beyond this point. The tubular portion 50 mounts a pair of spaced bearing members 65, 66, the inner races of which are fitted on the tubular portion 50 and spaced thereon through suitable spacer members 68. A clamping nut 69 is threaded onto a threaded extremity 70 of the tubular portion 50 to clamp the bearings 65, 66 thereon. The outer races 72, 73 of the bearing members 65, 66 are adapted to bear against the inner cylindrical surface of the casing section 22 with the edge of the bearing member 73 resting against a shoulder portion 75 of the cylindrical casing member. Further to aid in the positioning of the bearings within the casing section 22 and to preload the same, a spacing spring member 88 is positioned between the circular or annular flange 38 and the outer bearing race 72 as the parts 22 and 20 of the casing are positioned in assembled relationship to aid in holding the bearings and the impeller section of the rotor rigidly within the motor.

A tapered surface 80 at the one end of the cylindrical casing member which is located adjacent the impeller section 42 and spaced therefrom provides an outlet air passage for the motor. It aids in deflecting air discharged from the impeller section 42 and directs it toward the tool extremity where it will also serve to clean chips of the material being worked from the tool. This tapered surface also provides a spacing around the impeller section from the bearings for the outlet of a branch lubricating passage, as will be hereinafter defined.

In the assembled position, the tubular extension 33 of the end section 20 fits within the threaded extremity of the tubular portion 50 of the rotor section with a slight clearance therebetween, such as indicated by 90. This clearance provides an alternate or branch air passage in which the walls are in non-contacting relationship with the main air passage, such as indicated by the arrows 92, which is directed around through the cylindrical housing and past the bearings 65, 66 with a discharge air passage around the end cover section 42 and along the inclined surface 80 of the casing 22.

Figure 3:
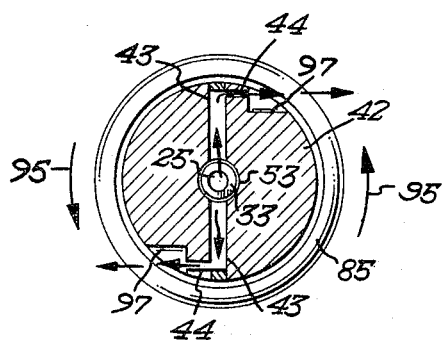
FIGURE 3 is a sectional of the motor of FIGURE 2 taken along lines 3—3 therein.

This sectional view of FIGURE 3 shows the air passage 53 in the impeller member 42 with the radially extending air passages 43 terminating in the transversely extending passage 44 defining the jets for the impeller section. These are directed out tangentially or at an angle to the peripheral surface of the impeller element 42 and in opposite directions to produce a reaction causing rotation of the impeller element as indicated by the arrows 95. The discharge air through the jets 44 at recessed portions 97 in the impeller element 42 surrounding the jets or jet passages provide for escape of the air through the open end 85 of the casing 20. The entire rotor section 40 is rigidly mounted within the casing by virtue of the shoulder 75 in the casing and the clamping of the bearing 65, 66 together with the action of the spacer member 68 acting against and spacing the bearing members 65, 66. The clamping action for preloading the bearings and completing the spacing is obtained through the spacer washer of the spring type 88 which bears against the outer race 72 of the bearing 65 to accurately position the tubular portion 50 mounting the inner races of the bearings 65, 66 and positively position the impeller element 42 within the casing. The output section of the motor is defined by the extension or tubular portion 55 integral with the impeller element 42 to which the coupling parts 56, 58 provide for connection and mounting of a tool, such as the cutter 18. While I have shown the shaft 60 of the tool 18 as closing the air passage to the impeller, it will be understood that this portion of the apparatus may be independently sealed through means other than the shaft 60 of the cutting tool.

In the operation of the improved air motor, the source of air under pressure, such as indicated at 12 in FIGURE 1, and regulated by a regulating valve 15 provides an air source to the motor of approximately 90 pounds per square inch. The lubricator for introducing oil into the air provides for an oil mist in the air line 16 which is directed through the inlet passage 24 from the coupling member 28 to the inlet passage 53 of the motor. A substantial portion of the oil in the air from the source condenses on the inner walls of the air line through the coupling member 28 and on the walls of the inlet passage 53 of the motor. The majority of the air from the air source is directed into the impeller section and through the radially extending passages 43 to the jets 44 where it is directed outwardly therefrom along the edge of the peripheral surface of the inclined portion 80 of the casing 22 which air is exhausted through the open extremity 85 thereof, to provide a reaction producing rotation. The oil on the walls of the inlet passage clings to the walls and is moved by the air along the walls and through the alternate or branch passage around the rotor section 40 up to the area of the bearings and through the bearings to perform the necessary lubrication function. Because of the relative restriction in the main air passage to the impeller section, a portion of the air from the source is directed between the tubular extension 33 of the end section 20 and the tubular portion 50 of the impeller section or rotor section 40 through the branch passage, such as is indicated by the arrows 92, carrying the oil along the metal surface of the interior of the motor. This air and oil will be directed around the balls of the ball bearings and through the openings therebetween fully lubricating the ball bearings and increasing the life of the same. The oil will serve to lubricate and cool the bearings and then it will be disclosed along the inclined surface 80 of the casing and around the edge of the impeller section 42 through the open extremity 85 as of the casing part 22. The arrangement of parts and the separation in the air line provides the branch or alternate air passage 92 which permits the separation of a substantial part of the oil from the air flowing from the source and directing it to the bearings to lubricate and cool the same.

While it is recognized that oil has been used in air lines of pneumatic devices in the past, it is believed that no one has previously provided a separation in the main air supply line to take advantage of the oil clinging to the walls of the inlet air conduit and utilize this separation to provide an alternate or branch passage by means of which substantial part of this oil may be directed to the bearings of the rotating device to lubricate and cool the same. This substantially increases the life of the pneumatic device and improves the operation of the same. Because of the relative restriction in these passage, a small portion of the source air is directed between the tubular extension 33 of the end section 20 and the tubular portion 50 of the impeller section or rotor section 40, such as indicated by the arrows 92, carrying the oil along the metal surface of the interior of the motor. This air and the oil will be directed around the balls in the ball bearings and through the opeinngs therebetween cooling and lubricating the ball bearings and increasing the life of the same. The oil will serve to lubricate and cool the bearings and then be discharged along the inclined surface 80 of the casing and around the edge of the impeller section 42 through the open extremity 85 of the casing part 22.

This improved motor design is very compact and is simple such that it may be readily disassembled and the bearings 65, 66 replaced when necessary. The improved motor design does not require a positive connection between the stationary and movable parts of the motor since the spacing between these parts provide the alternate passage for cooling and lubrication of the bearings to increase the life of the motor. This simplified design is economical to manufacture and may be readily maintained. This improved motor is designed to operate in the range around 100,000 r.p.m. and as such is suitable for industrial usage in the driving of drills, burnishes, grinders, rotary files and other cutting tools for varying types of materials. The compact and small size permits the motor to be used in other than hand operations such as mounting in spindles and in the collet of machine tools.

Therefore, in considering this invention it should be remembered that the present disclosure is intended to be illustrative only and the scope of the invention should be determined by the appended claims.

What is claimed is:

1. An air motor comprising, a casing means including an input end section and a cylindrical casing section with an open extremity, a rotor section for the motor including a cylindrical impeller section and a pair of concentric transverse tubing portions extending to either side thereof, spaced bearing means mounted on one of said tubing portions, output shaft coupling means mounted on and connected to other of said tubing sections, a tubular extension included in the input end section of said casing means and positioned in one end and spaced from said one of said transverse tubing portions of the rotor section to provide a tubular passage from said input end section of the casing means through said one of said tubing portions to said cylindrical impeller section, coupling means connecting the input end section and the cylindrical casing section of said casing means and positioning the bearing means on said one of said tubing portions of said rotor section to mount said rotor section within said casing means and space the impeller section from the cylindrical casing section, and means including shoulder means within said cylindrical casing section for positioning said bearing means therein, the input end section and said one of said tubing portions of said impeller section defining an air passage for a main air supply to said impeller section for rotating the motor, the spacing between the tubular extension of said input end section and said one of said tubing portions of said rotor section and the spacing between the impeller section and the cylindrical casing section together with said open extremity of the cylindrical casing section providing a second passage for the air supply, said air supply being adapted to have oil therein such that air movement through the second passage will cause oil to move along the tubular extension and on surfaces defining the second passage through the bearing means to lubricate and cool the same, said open extremity of said cylindrical casing section having a tapered surface adjacent the impeller section of the rotor section to facilitate air flow through the second passage and said bearing means.

2. The air motor of claim 1 and including a spring biased spacer means positioned on the coupling means of said casing means for preloading the bearings on said impeller section.

3. The air motor of claim 2 in which said output shaft coupling means is adapted to cooperate with a tool to seal the passage through the tubular portion of the impeller section beyond the impeller section to seal air passage beyond the impeller section.

4. The air motor of claim 2 in which the impeller section includes a pair of radially extending passages connecting to the tubular portion with transversely extending jet passages to the periphery of the impeller section adjacent the tapered surface of said casing.

5. An air motor comprising, a cylindrical housing having an inlet air conduit at one extremity thereof and open at the opposite extremity to provide an air outlet therefrom, a rotor for said motor including an impeller section and bearing means mounting said impeller section within said cylindrical housing with the impeller section adjacent the open end of said cylindrical housing, conduit means in said impeller section connecting with the inlet air conduit to provide a main air passage to the impeller section, said inlet air conduit and the conduit means in the impeller section being slightly spaced from one another to provide an alternate air passage through the bearing means to the open air outlet end of said cylindrical housing, said bearing means being positioned concentric to the axis of the cylindrical housing and the conduit means of said impeller section to support the impeller section in a cantilever type support, the inlet air passage being adapted to be connected to a source of air pressure having oil dispersed therein to provide lubrication of the bearing means through the alternate air passage and cooling of the bearing means, and a tapered surface at the open extremity of said cylindrical housing cooperating with exhaust ports in said impeller section and the air flow through the alternate passage to discharge air therefrom.

6. The air motor of claim 5 and including a concentric flange extension of said impeller section disposed on the surface opposite the air conduit means of the impeller section to provide an output coupling for the rotor to connect tools to the motor.

References Cited by the Examiner

UNITED STATES PATENTS

| | | | |
|---|---|---|---|
| 2,180,993 | 11/1939 | Monnier | 253—2 |
| 2,639,897 | 5/1953 | Prather | 253—175 X |
| 2,812,899 | 11/1957 | Meschino | 253—173 X |
| 3,032,988 | 5/1962 | Kleckner | 253—173 X |

MARTIN P. SCHWADRON, *Primary Examiner.*

EVERETTE A. POWELL, JR., *Examiner.*